Figure 1:
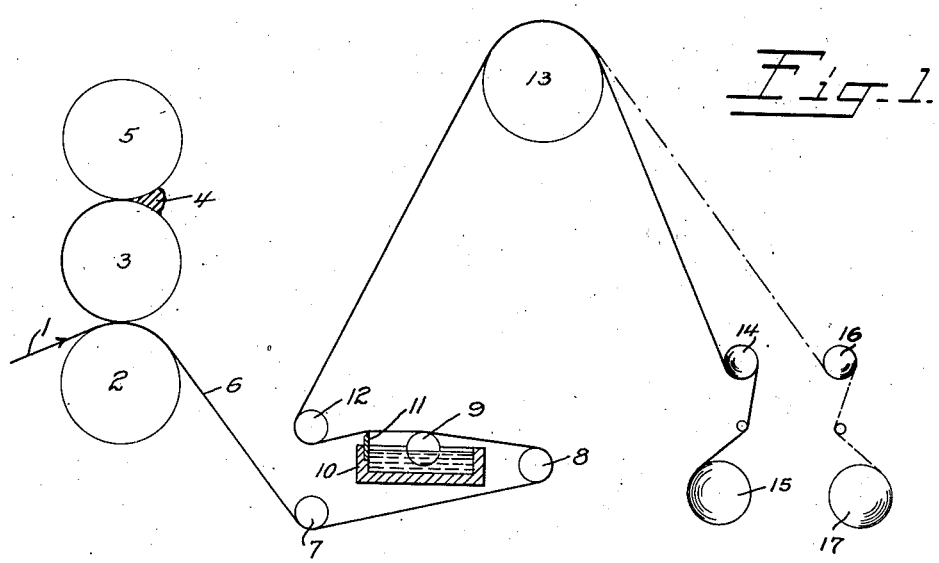

April 7, 1925.

C. H. DENNISON

SUPERFICIALLY FINISHED RUBBER ARTICLE OR MATERIAL
AND METHOD OF PRODUCING SAME

Original Filed Aug. 27, 1921

1,532,234

Inventor.
Charles H. Dennison,
By his Attorney.
Ernest Hopkinson.

Patented Apr. 7, 1925.

1,532,234

UNITED STATES PATENT OFFICE.

CHARLES H. DENNISON, OF QUINCY, MASSACHUSETTS, ASSIGNOR TO AMERICAN RUBBER COMPANY, OF EAST CAMBRIDGE, MASSACHUSETTS, A CORPORATION OF MASSACHUSETTS.

SUPERFICIALLY-FINISHED RUBBER ARTICLE OR MATERIAL AND METHOD OF PRODUCING SAME.

Continuation of application, Serial No. 496,008, filed August 27, 1921. This application filed December 6, 1922. Serial No. 605,176.

*To all whom it may concern:*

Be it known that I, CHARLES H. DENNISON, a citizen of the United States, residing at Quincy, in the county of Norfolk and State of Massachusetts, have invented certain new and useful Improvements in Superficially-Finished Rubber Articles or Materials and Methods of Producing Same, of which the following is a full, clear, and exact description.

This invention relates to superficially finished rubber articles or materials and the method of producing same, and more particularly to the production of such articles or materials with a hardened or frictionless surface or both, and is a continuation of my co-pending application Serial No. 496,008, filed August 27, 1921.

Articles or materials formed of uncured or soft cured rubber have a soft surface and the characteristic non-slip or frictional feel of rubber, whereas, in the rubber art, it is often desirable that such articles or materials have a hardened or frictionless surface, or both. Attempts have been made to obviate the latter of these objections, in the case of water bags, rubber footwear and other articles, by applying starch to the surface prior to vulcanizing to produce the so-called velvet finish. Articles so finished have a smooth and frictionless surface, but it is not a hard one, and prior to my invention no suitable method of producing a hard surface when desired has been devised. Many rubber articles are also finished by applying a varnish to the surface, but if this varnish is a hard one, it tends to check or crack in use when applied to a flexible article, and at best is a mere makeshift. Moreover, in the use of such varnishes when applied to relatively thin-walled articles, the solvent tends to strike through the material and stain the interior. In recent years vulcanizable compounds have also been applied in the making of artificial or imitation leather, but articles made of such material have a soft and dull exterior surface entirely dissimilar to the relatively hard surface of finished leather and they are also lacking in the leatherlike slip or feel to the touch characteristic of finished leather. Prior to my invention, the only finish applied to such imitation leathers of vulcanizable material has been varnish, which is open to the objections above stated. Moreover, such varnishes wear and scuff off very readily in use, and can ordinarily be applied only to the finished articles.

An object of my invention is to provide a method for imparting a protective finish to rubber and similar vulcanizable materials, or compounds thereof.

Another object is to provide a method for superficially hardening such materials.

Another object is to provide an improved method for removing the frictional feel from rubber.

Still another object is to provide an improved method for making imitation leather from vulcanizable material.

A further object is to produce an article of rubber having improved surface characteristics.

A still further object is to produce a rubber-containing material or article with a leatherlike finish.

Figure 2:
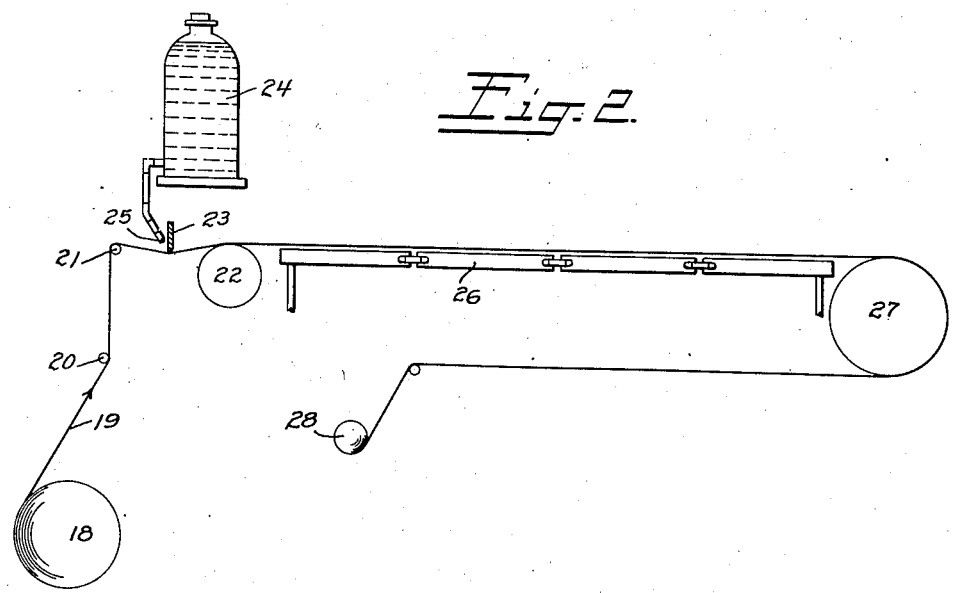

For a detailed disclosure of the invention reference is had to the accompanying specification and drawings, which latter illustrate a specific embodiment thereof, and in which Figure 1 is a diagrammatic view illustrating a calendar and a device for coating the calendered sheet to prevent sticking thereof; and Figure 2 is a diagrammatic view of an apparatus used in producing a hardened surface and leatherlike slip in sheet material such as imitation leather.

The invention will first be described with reference to the specific embodiment disclosed in the drawings, in which latter a backing sheet 1 (Fig. 1) is passed between the calender rolls 2 and 3 and coated with a vulcanizable compound 4 inserted between the calender rolls 3 and 5. The calendered sheet 6 then passes over the guide rolls 7 and 8 and over a roll 9 immersed in a receptacle 10 containing soap solution. The excess solution is removed by the scraper 11, and the sheet after passing over the rolls 12 and 13 is wound up on the roll 14 with or without a liner from the roll 15. It is preferred to have the wind-up roll and liner roll in duplicate, as shown at 16 and 17. The sheeted material is then hung up on racks in a vulcanizer and cured. After curing, a roll 18 of the material is disposed in the apparatus shown in Fig. 2, and the sheet 19 of the material is passed over the guide rolls 20, 21 and 22, a knife edge or spreader 23, preferably of glass, being disposed between the rolls 21 and 22. The numeral 24 designates a receptacle, which in the present instance, is used to hold a solution of bromine in carbon tetrachloride, and the solution is supplied by the manifold 25 to the spreader 23. From the roll 22 the coated sheet passes over a steam box 26 where the solvent is evaporated, and after passing over the roll 27 is wound up on the roll 28. As many treatments with the bromine solution are given as are necessary to produce the desired effect, and it has been found in practice that two ordinarily are sufficient. The action of the bromine on the compound is such as to produce a superficial hardening and removes the non-slip or frictional feel of the rubber, leaving instead a leather-like slip which is a very close approximation of the feel of finished genuine leather. By the use of varnish, or other coating material, a surface layer or coating is produced of an entirely different nature from the vulcanizable material directly next to it, with a distinct line of demarkation between the two. By my process, however, the vulcanizable material itself is hardened and otherwise changed at and immediately adjacent its surface, and the change extends inwardly a short distance in gradually lessening degree, thus providing a hardened and wear-resisting surface of great durability, which is an integral part of the material and free from any tendency to check, crack or peel off.

The material produced by the specific embodiment of the process above described is capable of various uses as a substitute for leather and is particularly adapted for use in the making of imitation leather or so-called "leatherette" coats. For certain purposes it may be desirable to incorporate in the vulcanizable compound a certain amount of ground leather, and in the manufacture of imitation leather containing this, the backing sheet is first friction coated with a rubber compound which contains no leather, and then given a second coating on a calender with a compound containing the ground leather, and the sheeted material is then given a coat of soap solution in a manner similar to that disclosed in Figure 1. It is preferred in this case to treat the sheet material with a bromine solution before curing and the sheet is therefore next run through the apparatus disclosed in Fig. 2 as many times as is necessary to produce the desired result, after which the imitation leather may be embossed in any suitable grain, if desired and finally cured. However, the method last described may be varied by embossing after treatment with the soap solution, then partially curing, followed by the bromine treatment, and a final cure. The grained or smooth material may be used for making pocket books, card cases, baggage, for upholstery, and for practically every purpose for which the genuine leather is suitable.

While in the embodiment just described the material is in sheeted form and the treating agent has been applied by spreading, it is obvious that the mode of application will be varied according to the form and composition of the material and as the best practice may dictate, and the invention includes spraying, dipping, brushing or any other suitable method of applying the treating agent. The invention is capable of extensive use wherever it is desired to impart the surface characteristics of hardness and slip, or either of them, to articles or materials of rubber, or its compounds, such as water-bottles, inner tubes, tires, rubber toys, rubber tiling, etc.

It is preferred to use bromine in the superficial treatment of the material as it is relatively inexpensive, and its action, while sufficiently rapid, is readily controlled and not harsh, producing in the material that much to be desired smooth and non-frictional slip to the touch characteristic of the natural finished leather, and also superficially hardening it. However, it has been found that chlorine and iodine have a superficial action on the rubber and the scope of the invention includes the use of any suitable equivalent for the bromine. Carbon tetrachloride is preferred as a solvent owing to its volatility, non-inflammability, comparative cheapness, and chemical inertness with respect to the materials employed, but any other suitable solvent may be substituted. It has been found in practice that with the majority of compounds the strength of the solution may be in the proportion of about 75 c. c. of bromine to 2500 c. c. of carbon tetrachloride, but the strength will, of course, be varied, according to the length of time during which material is exposed to the action and also in accordance with the material used and the depth and degree to which the change in character is desired. In practice when the material is to be cured the use of the ordinary dry heat cure in vulcanizing has been found to be very satisfactory, but the steam cure may also be used, and in certain conditions may perhaps be preferable, or a combination of both dry heat and steam cure may be employed. The soap solution is used to prevent sticking of the sheeted material, and in the case where the calendered material is to be supplied directly to the bromine spreading apparatus or the material is not in sheet form, the use of the soap solution may be dispensed with.

It will be seen that by my invention, rubber articles and materials generally may be provided with a hard and frictionless surface which will not check, crack or peel off, and which forms an integral part of the material itself, and the invention is capable of extensive application in the rubber art.

It is obvious that with the above disclosure numerous modifications will suggest themselves to those skilled in the art, and it is not desired that the invention be limited other than by the scope of the appended claims.

Having thus described my invention, what I claim and desire to protect by Letters Patent is:

1. The method of changing the surface characteristics of a rubber containing material which consists in superficially hardening it by treatment with bromine.

2. The method of changing the surface characteristics of a rubber containing material which consists in applying a free halogen in dilute solution to the surface of the material.

3. The method of changing the surface characteristics of a rubber containing material which consists in applying bromine in solution to the surface of the material and removing the solvent by heat.

4. The method of changing the surface characteristics of a body of rubber or a compound thereof which consists in hardening and imparting a leatherlike slip or gloss to the surface of the body by a brief treatment of the surface with a dilute solution of bromine.

5. The method of producing a superficial hardening and leatherlike slip or gloss on rubber or compounds thereof which consists in both superficially treating it with a halogen and vulcanizing it.

6. The method of producing a superficial hardening and leatherlike slip or gloss on rubber or compounds thereof which consists in both superficially treating it with bromine and vulcanizing it.

7. The method of producing a superficial hardening and leatherlike slip or gloss on rubber or compounds thereof which consists in both superficially treating it with bromine in solution and vulcanizing.

8. The method of making an imitation leather which consists in sheeting a vulcanizable compound, hardening the surface thereof and imparting a leatherlike slip or gloss to it by one or more applications of a halogen to the surface, and finally curing.

9. The method of making an imitation leather which consists in coating a fabric with a vulcanizable compound, superficially treating the compound with a halogen, and finally curing.

10. The method of making an imitation leather which consists in coating a fabric with a vulcanizable compound, applying a plurality of coatings of a halogen in solution and drying between the coatings, and finally curing.

11. The method of making an imitation leather which consists in coating a fabric with a vulcanizable compound, applying a plurality of coatings of bromine in solution and drying between the coatings, and finally curing.

12. The method of making an imitation leather which consists in coating a fabric with a vulcanizable compound, superposing on said coating a coating of a vulcanizable compound containing leather, superficially treating the material with a halogen, and curing by heat.

13. The method of making an imitation leather which consists in coating a fabric with a vulcanizable compound, superposing on said coating a coating of a vulcanizable compound containing leather, superficially treating the material with bromine, whereby a leatherlike slip or gloss and surface hardening is produced, and curing by heat.

14. The method of making an imitation leather which consists in coating a fabric with a vulcanizable compound, superposing on said coating a coating of a vulcanizable compound containing leather, superficially treating the material one or more times with a solution of bromine, whereby a leatherlike slip or gloss and surface hardening is produced, and curing by heat.

15. The method of making an imitation leather which consists in coating a fabric with a vulcanizable compound, calendering on said first coating a coating of a vulcanizable compound containing leather, applying a coating of soap solution, applying one or more coats of a solution of bromine in carbon tetrachloride and drying between coats, suitably embossing, and curing by heat.

16. As a new article of manufacture, a body formed of vulcanized rubber or a compound thereof and having an integral bromine hardened surface portion characterized by a frictionless leatherlike slip or feel to the touch.

17. As a new article of manufacture, a flexible, superficially bromine hardened sheet of vulcanized material.

18. As a new article of manufacture, a flexible sheet composed of vulcanized material and leather and having an integral bromine hardened surface portion characterized by a frictionless leatherlike slip or feel to the touch.

19. As a new article of manufacture, a body having a bromine-hardened rubber containing surface portion.

20. As a new article of manufacture, a body having a hardened and frictionless surface portion of a rubber containing material combined with bromine.

Signed at Cambridge, county of Middlesex, and State of Massachusetts, this 29th day of November, 1922.

CHARLES H. DENNISON.